United States Patent
Ebert et al.

(10) Patent No.: US 7,601,263 B2
(45) Date of Patent: Oct. 13, 2009

(54) COMPOSITE MEMBRANE AND PROCESS

(75) Inventors: Katrin Ebert, Luneburg (DE); Joachim Koll, Hamburg (DE); Jan Wind, Lauenburg (DE)

(73) Assignee: GKSS-Forschungszentrum Geesthacht GmbH (DE)

( * ) Notice: Subject to any disclaimer, the term of this patent is extended or adjusted under 35 U.S.C. 154(b) by 243 days.

(21) Appl. No.: 11/480,788

(22) Filed: Jul. 3, 2006

(65) Prior Publication Data

US 2007/0007195 A1      Jan. 11, 2007

(30) Foreign Application Priority Data

Jul. 5, 2005     (DE) ........................ 10 2005 031 703

(51) Int. Cl.
*B01D 61/00*     (2006.01)
*B01D 39/00*     (2006.01)
*B01D 39/10*     (2006.01)
*B01D 71/06*     (2006.01)
*B01D 63/00*     (2006.01)

(52) U.S. Cl. .................. 210/651; 210/490; 210/500.27; 210/500.35; 210/652

(58) Field of Classification Search ................ 210/650, 210/651, 652, 500.27, 500.35, 490, 640; 424/78; 95/45–52; 422/88; 428/343; 514/772.3
See application file for complete search history.

(56) References Cited

U.S. PATENT DOCUMENTS

| | | | |
|---|---|---|---|
| 4,062,882 A | | 12/1977 | Sen Gupta |
| 4,851,216 A | * | 7/1989 | Lee .......................... 514/772.3 |
| 4,977,006 A | * | 12/1990 | Smith et al. ................. 428/42.2 |
| 5,464,588 A | * | 11/1995 | Bather et al. ................... 422/88 |

(Continued)

FOREIGN PATENT DOCUMENTS

AT     343244     10/1978

(Continued)

OTHER PUBLICATIONS

Stafie N., et al.:"Insight into the transport of hexane-solute systems through tailor-made composite membranes" Journal of Membrane Science, Elsevier Scientific Publ. Company. Amsterdam, NL. Bd. 228, Cr. 1, 1 . Jan. 2004, Seiten 103-116, XP004482123, ISSN:0376-7388.

(Continued)

*Primary Examiner*—Ana M Fortuna
(74) *Attorney, Agent, or Firm*—Thomas, Kayden, Horstemeyer & Risley, LLP.

(57) ABSTRACT

The invention relates to a composite with a separation-active membrane layer and a supporting membrane, a process for the production of the same and a process for using the same. The composite membrane according to the invention is distinguished by the fact that the separation-active membrane layer comprises a polymer hardened by electromagnetic radiation with wave length that is less than 800 nm and/or by electron beams. The process according to the invention is distinguished by the fact that a layer of a solution of a polymer that can be hardened by electromagnetic radiation with a wavelength that is less than 800 nm and/or by electron beams and an initiator substance is applied to a supporting membrane and subsequently is hardened by electromagnetic radiation and/or by electron beams. The use according to the invention serves to retain low molecular weight substances from organic solutions.

16 Claims, 1 Drawing Sheet

U.S. PATENT DOCUMENTS

| | | | |
|---|---|---|---|
| 5,977,282 A | 11/1999 | Ebbrecht | |
| 6,060,530 A * | 5/2000 | Chaouk et al. | 521/64 |
| 6,187,432 B1 * | 2/2001 | Krish et al. | 428/343 |
| 6,211,322 B1 | 4/2001 | Döhler | |
| 6,818,133 B1 * | 11/2004 | Wolter et al. | 210/640 |

FOREIGN PATENT DOCUMENTS

| | | |
|---|---|---|
| DE | 3151966 | 12/1981 |
| DE | 690 16 391 | 6/1995 |
| DE | 19507584 | 9/1996 |
| DE | 693 12 970 | 12/1997 |
| DE | 2005002716 | 8/2006 |
| EP | 0681862 | 11/1995 |
| EP | 0985443 | 7/1999 |
| JP | 62136212 | 6/1987 |
| JP | 59225705 | 9/1996 |
| WO | 9627430 | 9/1996 |
| WO | 03084651 | 10/2003 |

OTHER PUBLICATIONS

European Search Report dated Jul. 26, 2007.
Japanese Examination Report dated Jul. 15, 2008.
Presentation given by Dr. Sascha Herrwerth of Goldschmidt AG, Cationic and Free Radical UV-Curing Silicone Release Coating on Apr. 6, 2006.
Stafie, et al., "Insight into the Transport of Hexane-Solute Systems Through Tailor-Made Composite Membranes," Journal of Membrane Science 228, (2004), pp. 103-116.
English version of German Office Action dated Jul. 12, 2006.

* cited by examiner

COMPOSITE MEMBRANE AND PROCESS

CROSS REFERENCE TO RELATED APPLICATIONS

This application is a continuation application, which is based on and claims priority to German Patent Application DE 10 2005 031 703.0, filed Jul. 5, 2005, and which is incorporated herein in its entirety.

BACKGROUND

The invention relates to a composite membrane with a separation-active membrane layer and a supporting membrane. The invention relates further to a process for the production of a composite membrane of this type as well as to the use of a composite membrane of this type.

In the separation or retention of low-molecular substances from organic solutions, very energy-intensive preparation steps are usually used, for example, distillation, filtration, desliming, deacidification, deodorizing, bleaching, and so on. For example, in the production of edible oil a part of the edible oil is obtained by means of hexane extraction from the oil seed. In the extraction by means of this organic solvent (n-hexane) ca. 99% of the oil contained in the seed, but also other accompanying substances, are dissolved out. In a series of additional processing steps, solvents and accompanying materials must be separated after the extraction in order to obtain pure edible oil. Customarily this is done by means of a very complicated process in which, along with chemicals, large amounts of water are required. First, the solvent is removed from the extraction mixture, which comprises ca. 30% oil, at ca. 150° C. From the miscella arising in so doing, for example, phosphorus lipids are removed by precipitation with aqueous solutions of phosphoric acid and sodium hydroxide solution. After the oil has subsequently been washed, in order to remove remaining chemical residues, it is dried. Through the addition of activated carbon, dyes, such as chlorophyll and beta carotine, are removed. In the last treatment step, the material is deodorized with water vapor in a vacuum at ca. 200° C. in order to remove irritating odorous substances.

The production of an edible oil obtained by solvent extraction has previously been done via a conventional process which is very energy-intensive and in which great amounts of water and chemicals must be used. From AT 343 244 B, which corresponds to U.S. Pat. No. 4,062,882 A, a process for refining compositions of raw glyceride oil are known, said process using a porous membrane in order to separate components of different molecular weight. The separation limits specified in these steps lie between 1,500 and 200,000 in regard to the molecular weight. Preferred is a range from 10,000 to 50,000 mw (mw meaning molecular weight). The membranes are polycyinitrile [sic] membranes and serve for separating phospholipids which aggregate in relatively large amounts in the solution to be separated.

In DE 31 51 966 C2 which corresponds to U.S. Pat. No. 4,414,157 A, the use of porous polyimide hollow fiber membranes for the separation of phospholipids from n-hexane is described. The membranes used have a separation limit between 10,000 to 100,000 mw.

In the Journal of Membrane Science, 282 (2004), pages 103 to 116 a composite membrane for the separation of oil/n-hexane mixtures is described. The composite membrane consists of a polyacrylnitrile supporting membrane and a separation-active layer of polydimethylsiloxane (PDMS). For this, a high-molecular prepolymer with vinyl groups is used. The cross-linking is done by hydrosylilation with the aid of a platinum catalyst and a cross-linking agent which consists of short-chain PDMS with hydride groups. The stability of this membrane in edible oil/n-hexane mixtures is however relatively brief.

In the state of the art no membranes have been specified previously which have a high separation power for low-molecular substances with a separation limit of under 2,000 (preferably between 200 to 1,500) in oil/n-hexane mixtures with simultaneous long-term stability of the membrane. Furthermore, the preparation processes of edible oil/n-hexane mixtures are very energy-inefficient and must furthermore be carried out at higher temperatures so that the quality of the oil can be reduced. Furthermore, conventional processes require the use of chemicals such as, for example, sodium hydroxide solution which subsequently must be removed from the oil once again in a complicated manner. Thus, the consumption of water and energy is relatively high for the conventional processes.

DETAILED DESCRIPTION

Figure 1:
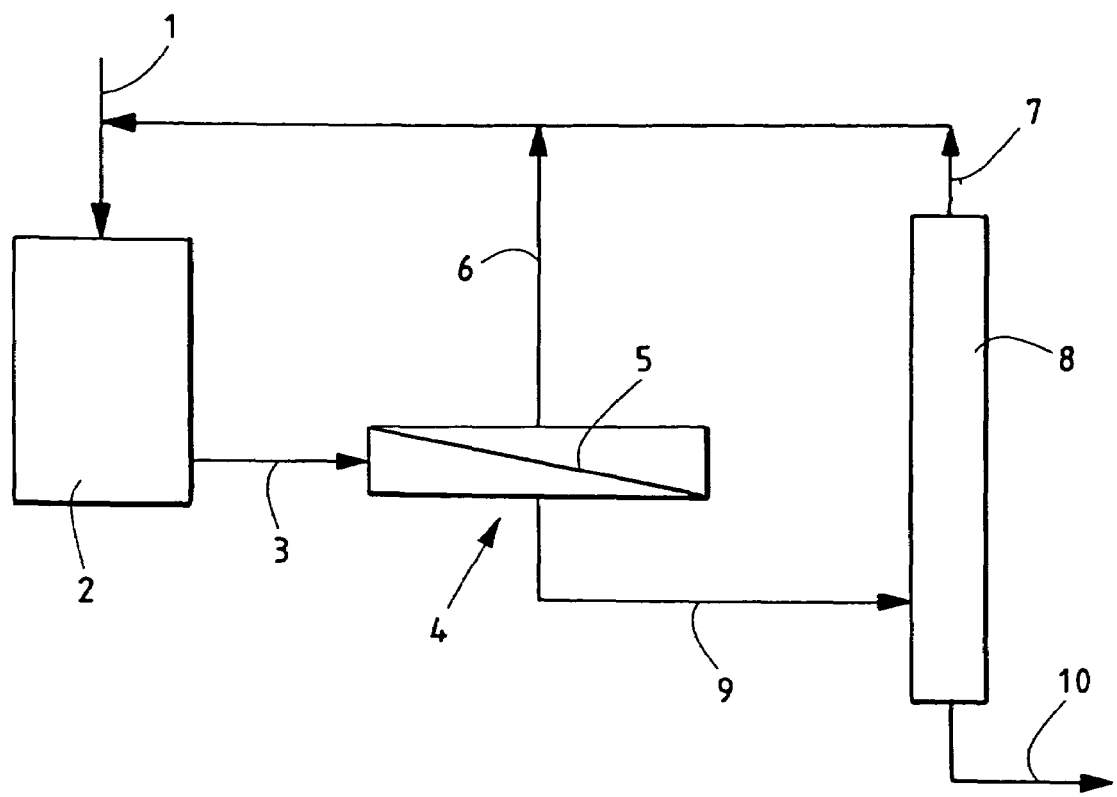
FIG. 1 is a schematic representation of a membrane separation process.

It is the objective of the present invention to produce a composite membrane which has, along with a relatively low separation limit, high long-term stability in organic solutions or aqueous solutions contaminated with organic solvents. Along with this, it should be possible to produce the corresponding composite membrane rapidly and simply. Furthermore, the composite membrane should have as high a retention power for low-molecular substances as possible.

This objective is realized by a composite membrane with a separation-active membrane layer and a supporting membrane, where the separation-active membrane layer comprises a polymer hardened by electromagnetic radiation with a wavelength that is less than 800 nm and/or by electron beams. In the scope of the invention the wording hardened also covers the wording cured.

Due to the use of a polymer hardened by electromagnetic radiation with a wavelength that is less than 800 nm and/or by electron beams there is very good solvent-stability of the separation-active membrane layer. Here the stability of the separation-active membrane layer for various solvents depends on the respective material. In particular, the ability to produce it in a very rapid and simple manner follows since the hardening of polymer by means of high-energy radiation or electron beams takes place very rapidly and thus lengthy processes can be avoided. Preferably, the separation-active membrane layer is a nanofiltration membrane, where this in particular only forms minimally small pores by swelling in the solution. In the dry state the separation-active membrane layer or the nanofiltration membrane layer according to the invention is gas-tight. The separation limit, which specifies the molecular weight that is retained up to 90%, is preferably in a range less than 1,500 mw and preferably in the range between 200 and 1,000 mw.

Preferably, the wavelength is less than 400 nm. This is preferably higher-energy radiation which lies at least in the ultraviolet. Preferably, the wavelength goes down to 1 nm.

A particularly preferred form of embodiment occurs when the separation-active layer comprises a silicone acrylate. Preferably, the separation-active layer consists of a silicone acrylate. The silicone acrylate is preferably the following compound:

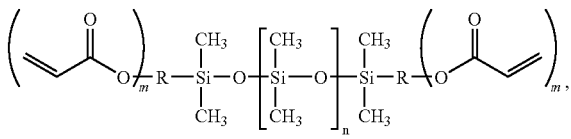

where m and n are whole numbers and R represents an alkyl functional group.

This silicone acrylate which, for example, can be obtained under the trade name TEGO® 902 from the firm Degussa AG (Goldschmidt Industrial Specialties), Germany is particularly well suited for the preparation of edible oil with n-hexane since it has high long-term stability in edible oil/n-hexane mixtures and furthermore very good separation properties. In principle, the silicone acrylates of the TEGO® 900 series are suitable for this application. The group of silicone acrylates of the TEGO® 720 series can be suitable in particular for petroleum refining. The chemical structure for this is the following:

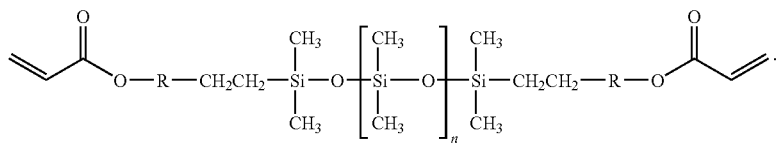

Also, the following chemical structure of silicone acrylates hardened with UV radiation is suitable for certain applications, for example, for the purification of pharmaceutical substances:

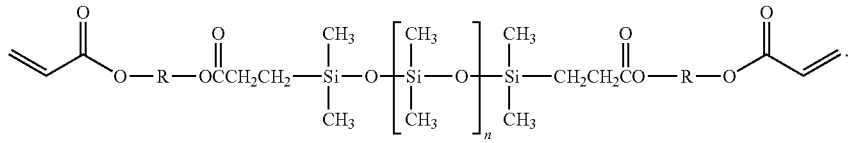

Preferably, the supporting membrane comprises polyacrylnitrile (PAN) and/or polyvinylidene fluoride (PVDF). If the supporting membrane preferably comprises an inorganic porous material, such as, for example, $TiO_2$, $ZrO_2$, and/or $Al_2O_3$, the membranes according to the invention can also be used for the preparation of solutions which comprise dipolar aprotic solvents, such as, for example, dimethylformamide (DMF).

Preferably, the composite membrane according to the invention is hydrophobic. The supporting membrane preferably also comprises an organic layer on an inorganic supporting layer. In this case, particularly uniform separation-active layers can be produced. The supporting membrane of at least two layers can, for example, be PVDF/$TiO_2$ or PAN/$TiO_2$.

A process according to the invention for the production of a composite membrane according to the invention is characterized by the fact that a layer of a solution of a polymer which can be hardened by electromagnetic radiation with a wavelength that is less than 800 nm and/or by electron beams and an initiator substance is applied to a supporting membrane and subsequently is hardened by electromagnetic radiation and/or by electron beams. The initiator substance can, for example, be an initiator solution, such as, for example, Photo Compound 750 which is from the firm Goldschmidt GmbH.

Preferably, the solution comprises a solvent which is vaporized before the hardening of the polymer. This can be, for example, 2-propanol. The initiator is preferably a photoinitiator which forms free radicals under irradiation with UV light.

Preferably, the supporting membrane has pores of a type such that the solution essentially remains on the surface of the supporting membrane. Preferably, the small pores are provided on the surface of the supporting membrane. The pore distribution should be as narrow as possible and the average pore radius so small that the molecules of the solution, in particular the silicone acrylate solution, cannot penetrate into the pores of the carrier layer.

According to the invention, a composite membrane according to the invention for the retention of low-molecular substances from organic solutions will be used. Preferably, the composite membrane is used for the purification of pharmaceutical substances, for preparation of edible oils, for the separation of homogeneous catalysts from organic solutions, and/or for the preparation of petroleum fractions.

The invention will be described in the following, without limitation of the general inventive concept, with the aid of embodiment examples with reference to the drawings, where, with respect to details according to the invention and not explained in the text, reference is expressly made to the drawings. Shown are:

FIG. 1 shows schematically a membrane separation process for the preparation of edible oil, e.g., rapeseed oil. The rapeseed oil to be refined is found in an extraction device 2, into which the n-hexane 1 is introduced in order to perform an extraction of the oil. The reference numeral 3 denotes an oil/solvent mixture 3, which is brought into a membrane device. In the membrane device 4 a composite membrane 5 according to the invention is disposed. This serves for the separation of low-molecular substances, such as, for example, n-hexane and additional solvents, from the oil. With 6 a solvent-enriched stream is shown as permeate which is fed back into the circuit, i.e., into the extraction apparatus 2. An oil-enriched stream 9 is brought into a distillation apparatus 8, in which n-hexane 7 is distilled out, e.g., through the action of heat. The n-hexane 7 will also be fed back into the process. The edible oil 10 obtained is drained out of the distillation device 8.

The composite membrane according to the invention is suitable for the separation of low-molecular materials from organic solutions. In particular, the membrane is suitable for the preparation of edible oil/n-hexane mixtures. The membrane is distinguished by very good separation properties and long-term stability in edible oil/n-hexane mixtures.

In this embodiment example, the separation-active layer of the membrane according to the invention consists of a silicone acrylate, which has been cross-linked by irradiation with UV light. Through the cross linking, the particular solvent stability of silicone acrylate is achieved. The UV cross-linkable silicone acrylate can be a commercially available silicone acrylate, such as, for example, TEGO® 902 from the firm Degussa (Goldschmidt). Furthermore, an initiator solution, such as for example Photo Compound 750 from Goldschmidt GmbH, was used.

The supporting membrane can consist of known membrane-forming polymers, such as, for example, polyacrylinitrile (PAN) and/or polyvinylidene fluoride (PVDF). The supporting membranes can also consist of organic-inorganic membranes, such as, for example, PVDF/$TiO_2$ or a PAN/$TiO_2$ but also other membrane-forming polymers as well as of other inorganic components, such as, for example, $ZrO_2$, or comprise them. The supporting membrane can also consist of inorganic substrates, e.g., $TiO_2$, $ZrO_2$, and/or $Al_2O_3$ and also of other inorganic materials suitable for the production of membranes. Independently of the material, the supporting membranes must have on the membrane surface as narrow a pore distribution as possible and an average pore radius such that the molecules of the silicone acrylate solution cannot penetrate into the pores of the porous supporting membrane.

The coating solution comprises a certain concentration of UV cross-linkable silicone acrylate TEGO® 902 as well as the corresponding amount of required photoinitiator Photo Compound 750 in 2-propanol. This solution is applied to the supporting membrane by means of a suitable coating process, e.g., by dip coating or roll coating. Thereafter, the solvent is vaporized, e.g., in an oven at 100° C. The UV cross-linking of the silicone acrylate is done by irradiation with a mercury vapor radiator (polychromatic UV light). The irradiation dose is 800 mJ/$m^2$ in this embodiment example. The residual oxygen content in the radiation cell is under 50 ppm. The composite membrane's selective separation layer according to the invention preferably has a thickness in the range from 0.2 to 10 μm, preferably a thickness in the range of 1 μm to 5 μm.

The membrane according to the invention is distinguished by a high retention power for low-molecular substance in rapeseed oil with simultaneously good long-term stability in rapeseed oil/hexane mixtures.

The membrane according to the invention is a composite membrane with a separation-active layer which preferably comprises no pores. The composite membrane has the intrinsic gas separation properties of the silicone acrylate, which was confirmed by the measurement of the oxygen and nitrogen permeabilities. Thus the membrane is suitable for the separation of low-molecular substances. The long-term stability of the composite membrane in edible oil/n-hexane mixtures was confirmed.

The use of the membrane according to the invention can lead to significant cost reduction in the production of edible oil obtained by solvent extraction. Thus, for example, the consumption of water can be reduced by ca. 85%, the costs for waste water treatment by ca. 63%, and the necessary electrical power by ca. 62%. In addition, it was possible to reduce the losses in refining which occur in conventional production by 60%. Furthermore, it was possible to improve the quality of the edible oil since no, or only a slight, thermal treatment is necessary. It was possible to lower the emission of n-hexane by the use of membrane technology in the production of edible oil to at least 5% of the present level. In the previous mode of production ca. 1.7 kg of n-hexane per metric ton of processed seeds escape into the atmosphere. The production of rapeseed and soy oil in the countries of the European Union alone causes the emission of around 20,000 metric tons of n-hexane annually. Through the membrane according to the invention this emission can clearly be reduced.

EXAMPLE 1

Coating solution: 50.05 g of TEGO® 902, 7.49 g of Photo Compound 750, 157.55 g of 2-propanol The coating solution was applied by means of dip coating onto a PAN supporting membrane. Subsequently, this membrane was dried in an oven at 90° C. Thereafter, the membrane was cross-linked by means of a mercury medium-pressure radiator with polychromatic UV light under a nitrogen atmosphere (<50 pp, $O_2$). The radiation dose was 800 mJ/$cm^2$.

From the membrane thus produced a stamp with a diameter of 7.5 cm was stamped out and placed in an ultrafiltration cell from Millipore. 300 ml of a solution of 10% rapeseed oil in n-hexane was filled into this cell. With constant stirring, the separation behavior of the membrane was determined at 6 bar absolute pressure, i.e., a differential pressure of approximately 5 bar. The n-hexane permeability through the membrane was 1.08 l/$m^2$ h bar. The edible oil was retained at 90.3%.

For the determination of the long-term stability, the membrane described in this example was placed in solutions of 10% rapeseed oil in n-hexane and re-measured after 60 days.

| Days in solution | Permeability (l/$m^2$h bar) | Retention (%) |
| --- | --- | --- |
| 1 | 1.08 | 90.3 |
| 60 | 1.00 | 90.8 |

Membranes with a separation layer of UV cross-linked polymer and/or polymer which is cross-linkable or hardened by electron beams, and in particular a silicone acrylate, can be used for the preparation of organic solutions or of aqueous solutions contaminated with organic solvents. In so doing, low-molecular components can be separated from the solutions. With the use of sufficiently chemically-stable supporting membranes, which are to be chosen appropriately depending on the instance of application, these membranes can also be used for the preparation of solutions which comprise dipolar aprotic solvents. The fields of application are numerous, for example, the purification of pharmaceutical substances, the preparation of edible oil, the separation of homogeneous catalysts from organic solutions, and the preparation of petroleum fractions.

It is noted that the foregoing examples have been provided merely for the purpose of explanation and are in no way to be construed as limiting of the present invention. While the present invention has been described with reference to an exemplary embodiment, it is understood that the words which have been used are words of description and illustration, rather than words of limitation. Changes may be made, within the purview of the appended claims, as presently stated and as amended, without departing from the scope and spirit of the invention in its aspects. Although the present invention has been described herein with reference to particular means,

| List of Reference Numbers | |
|---|---|
| 1 | n-hexane |
| 2 | Extraction device |
| 3 | Oil/solvent mixture |
| 4 | Membrane device |
| 5 | Membrane |
| 6 | Solvent-enriched stream |
| 7 | n-hexane |
| 8 | Distillation device |
| 9 | Oil-enriched stream |
| 10 | Oil |

The invention claimed is:

1. A composite membrane with a separation-active membrane layer and a supporting membrane, wherein the separation-active membrane layer comprises a polymer hardened by at least one of electromagnetic radiation with a wavelength that is less than 800 nm and electron beams;
wherein the separation-active membrane layer comprises a silicone acrylate; and
wherein the silicone acrylate is selected from the group consisting of:

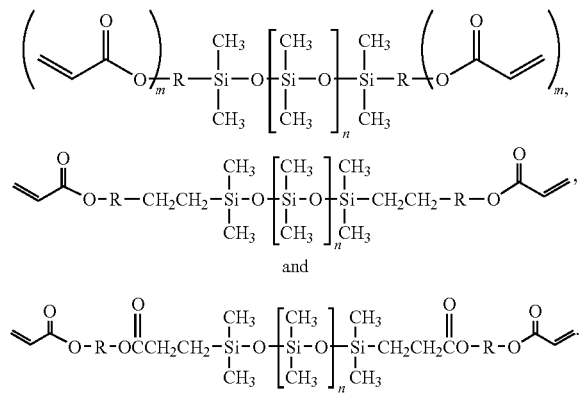

in which m and n are whole numbers and R is an alkyl functional group.

2. The composite membrane according to claim 1, wherein the wavelength is less than 400 nm.

3. The composite membrane according to claim 1, wherein the supporting membrane comprises polyacrylonitrile (PAN) and/or polyvinylidine fluoride (PVDF).

4. The composite membrane according to claim 1, wherein the supporting membrane comprises an inorganic, porous material.

5. The composite membrane according to claim 4, wherein the supporting membrane comprises an inorganic porous material selected from the group consisting of $TiO_2$, $ZrO_2$, $Al_2O_3$ and a combination thereof.

6. A process for the production of a composite membrane according to claim 1, wherein a layer of a solution of a polymer configured to be hardened by at least one of electromagnetic radiation with a wavelength that is less than 800 nm and electron beams and an initiator substance is applied to a supporting membrane and subsequently is hardened by at least one of: electromagnetic radiation and electron beams.

7. The process according to claim 6, wherein the solution comprises a solvent that is vaporized before the hardening of the polymer.

8. The process according to claim 6 or 7, wherein the supporting membrane has pores so small that the solution remains essentially on the surface of the supporting membrane.

9. A process comprising using a composite membrane according to claim 1 for retention of low-molecular weight substances from organic solutions.

10. The process according to claim 9, further comprising using the composite membrane for at least one of the following:
purification of pharmaceutical substances, preparation of edible oils, separation of homogeneous catalysts from organic solutions, and preparation of petroleum fractions.

11. The composite membrane according to claim 10, wherein the composite membrane is hydrophobic.

12. The composite membrane according to claim 1, wherein the separation-active membrane layer is a nanofiltration membrane.

13. The composite membrane according to claim 1, wherein the separation-active membrane layer is gas-tight in a dry state and only forms minimally small pores by swelling in solution.

14. The composite membrane to claim 1, wherein the membrane has a separation limit in a separation range of between approximately 200 mw and approximately 1,500 mw.

15. The composite membrane according to claim 14, wherein the separation limit is in a range of between approximately 200 mw and approximately 1,000 mw.

16. A process for the production of a composite membrane according to claim 1, wherein a layer of a solution of a polymer, which is configured to be hardened by at least one of electromagnetic radiation with a wavelength that is less than 800 nm and electron beams, and an initiator substance is applied to a supporting membrane and subsequently is hardened by at least one of: electromagnetic radiation and electron beams;
wherein the composite membrane comprises a separation-active membrane layer and a supporting membrane;
wherein the separation-active membrane layer comprises the polymer; and
wherein the supporting membrane has pores so small that the solution remainsessentially on the surface of the supporting membrane.

* * * * *